Nov. 13, 1962   H. BECKER ET AL   3,063,651
MOTION PICTURE PROJECTOR
Filed March 16, 1961   3 Sheets-Sheet 1

INVENTORS
HELMUT BECKER
ROBERT MEES
By Toulmin & Toulmin
Attorneys

United States Patent Office
3,063,651
Patented Nov. 13, 1962

3,063,651
MOTION PICTURE PROJECTOR
Helmut Becker, Wetzlar (Lahn), and Robert Mees, Wissmar, near Wetzlar (Lahn), Germany, assignors to Ernst Leitz G.m.b.H., Wetzlar (Lahn), Germany
Filed Mar. 16, 1961, Ser. No. 96,325
Claims priority, application Germany Apr. 13, 1960
4 Claims. (Cl. 242—55.12)

The present invention relates to an improvement of a motion picture projector, more particularly to the mechanism for rewinding the film strip wherein the film advancing member is withdrawn from the path of the film strip when the film strip is being rewound.

A conventional manner in rewinding a film strip in a motion picture projector comprises removing the film strip from the film guide plate and feeding the film strip directly from the take-up reel to a delivery reel. The delivery reel is then driven at increased speed in appropriate direction so that the film can be rewound within a relatively short time. If it is desired, however, to repeat single scenes in the film, the film strip must be rethreaded through the film guide plate. Accordingly, this method of rewinding film involves excessive time when it is desired to repeat portions of the film.

Motion picture projectors have also been constructed wherein the film can be rewound without being removed from the film guide plate. However, the rewinding of film in this type of projector cannot be done at a greater speed than the speed at which the film strip is fed through the guide plate in the forward direction. If greater speeds are attempted there is an excessive wear of the film strip perforations by the film advancing member. This wear can be prevented by withdrawing the film advancing member from the film strip so as not to mesh with the perforations during the rewinding process.

Previously proposed structure for withdrawing the film advancing member comprised manually operable means which act against spring tension so that actuation of the means will remove the film advancing member from the path of the film strip.

Such manually operated structures, however, are disadvantageous when used in motion picture projectors, because they must be manually adjusted and it is necessary for the projector operator to continuously actuate the means to keep the film advancing member in its withdrawn position. Further, if the film is rewound at a high speed and the film advancing member is not completely retracted the ends of the member will contact the film strip and possibly damage the same.

It is therefore the principal object of this invention to provide a novel and improved mechanism for rewinding the film strip in a motion picture projector.

It is another object of this invention to provide a novel and improved mechanism for withdrawing the film advancing member from the path of a film strip when the film strip is being rewound while passing through the film guide passage.

The objects of the present invention are achieved and the disadvantages of the prior art as discussed above are eliminated by the present invention which provides for the withdrawal of the film strip advancing member concurrently with the actuation of the mechanism for reversing the movement of the film through the projector.

In one embodiment of the invention a sliding member having a wedge-shaped surface is positioned so that the wedge-shaped surface is engageable with the film advancing member. A linkage is provided to connect the sliding member with the reverse button of the projector. Actuation of the reverse button will therefore cause the slider to cam the film strip advancing member out of the path of the film strip concurrently with the reversal of the motion picture projector.

Several modifications of the above described invention are possible. In one modification an electrical circuit is provided which both reverses the direction of the driving motor of the projector and which actuates an electromagnet for withdrawing the film advancing member from the path of the film strip. The circuit can be energized by means of a contact foil which is mounted near the end of the film strip so that when the end of the film strip approaches a set of open contacts the foil in passing across these contacts will close the circuit. This will both reverse the direction of the driving motor and will withdraw the film advancing member from the path of the film strip.

In addition, a light responsive element such as a photoelectric cell can be connected into circuit and actuated by light or dark areas provided on the film strip for this purpose.

Other objects and advantages of the present invention will be apparent upon reference of the accompanying description when taken in conjunction with the following drawings, wherein.

A specific embodiment and several modifications of this invention will next be described with reference to the drawings wherein like reference symbols indicate the same parts throughout the various views.

Figure 1:
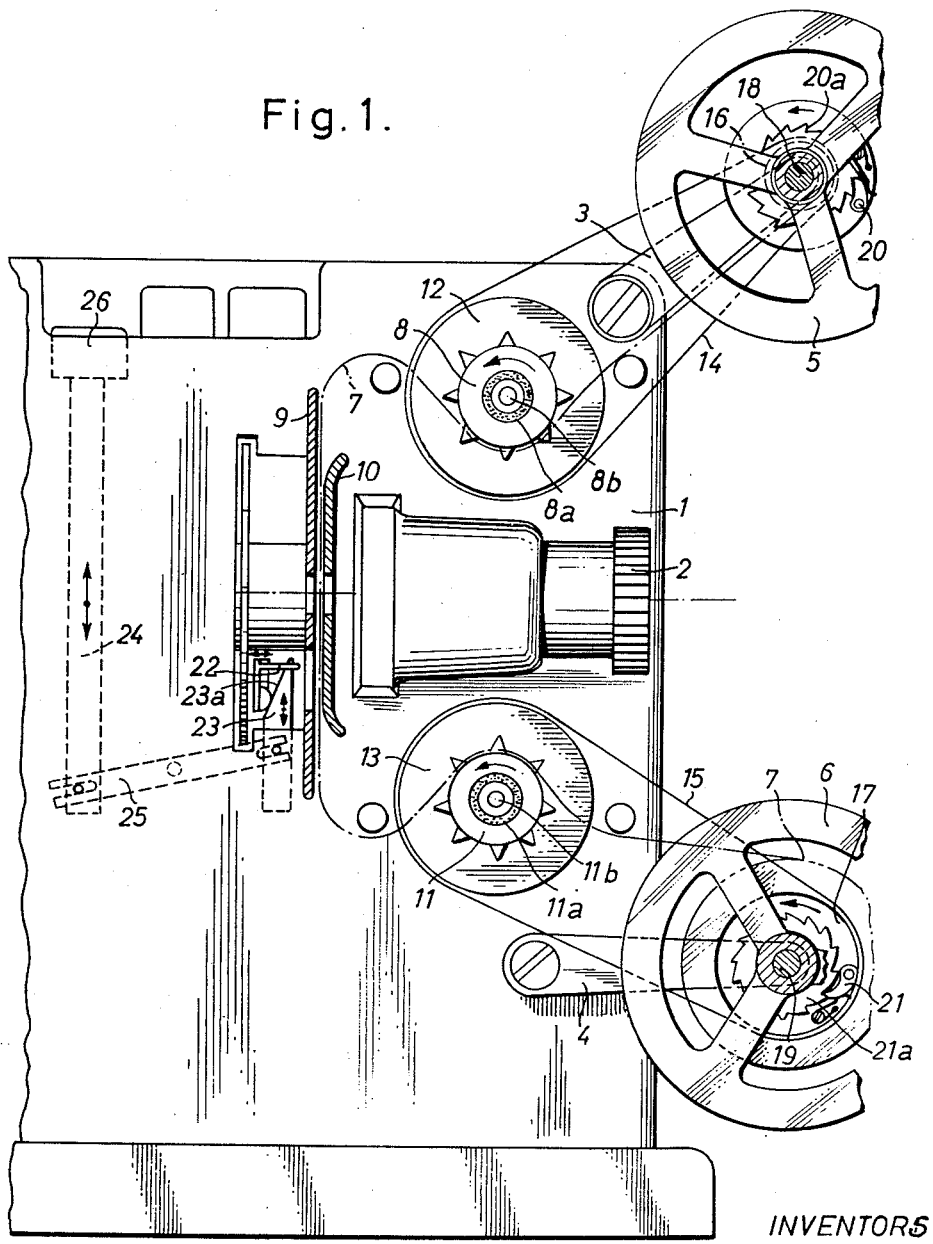
FIGURE 1 is a side elevational view of a motion picture projector showing schematically the mechanism for withdrawing the film advancing member.

Turning now to FIGURE 1 there is shown a casing 1 of a motion picture projector having an objective 2. The casing supports arms 3 and 4 upon which are respectively mounted a delivery reel 5 and a take-up reel 6. A film strip indicated at 7 is dispensed from the delivery reel 5 by a supply sprocket 8. The film strip passes through a film guide passage formed by a guide plate 9 and an aperture plate 10. Upon emerging from the guide passage the film strip passes over a sprocket 11 to the take-up reel 6.

The reels 8 and 11 are connected through electromagnetic couplings 8a and 11a with shafts 8b and 11b which shafts are driven in a conventional manner by the driving motor of the projector which is not shown in this view.

There are gear wheels 12 and 13 fixedly mounted upon the shafts 8b and 11b, respectively. A chain 14 drivingly connects the gear wheel 12 with a gear wheel 16 which is mounted on the end of the arm 3. A chain 15 drivingly connects the gear wheel 13 with another gear wheel 17 which is mounted on the end of the arm 4.

The gear wheels 16 and 17 are connected through clutches with shafts 18 and 19 upon which the reels 5 and 6 are respectively mounted.

The direction of the free wheeling and of the coupling of the clutches is indicated in FIGURE 1 by the direction of the ratchets 20 and 21 which engage the teeth 20a and 21a, respectively. A conventional friction coupling is employed between the shafts 18 and 19 and the reels 5 and 6, respectively, in order to compensate for the difference in the number of revolutions of the reels between their wound and rewound conditions.

The film strip 7 is intermittently advanced by a film advancing member or gripper 22. A slidably mounted member 23 has an inclined surface 23a which engages the film advancing member 22. A pivotally mounted lever 25 connects the slider 23 with a rod 24 which, in turn, is connected with a reverse button or contactor key 26.

In the operation of the above described embodiment the key 26 is depressed when it is desired to rewind the film. Upon actuation of this key three functions are simultaneously performed.

First, the driving motor of the projector is reversed to rotate in the opposite direction.

Second, the electromagnetic couplings 8a and 11a are disengaged so that the sprockets 8 and 11 freely rotate on their respective shafts.

Third, the slider 23 is moved upwardly in an axial direction so as to cam the film advancing member 22 to the left as viewed in FIGURE 1. This movement of the member 22 will cause the prongs thereof to be withdrawn from the path of the film strip within the film guide passage.

The gear wheels 12 and 13 which are fixed upon their respective shafts 8b and 11b are driven in the opposite direction by the reversal of the electric motor. Accordingly, the gear wheels 16 and 17 are also driven in the opposite directions by the chains 14 and 15, respectively. The arrows indicate the direction of rotation of the reels. It can be seen that the ratchet 20 will act as a coupling and will thus drive the supply reel 5 by means of the shaft 18. The reel 6, however, is released from engagement from the ratchet 21 and thus the film strip is withdrawn from the take-up reel 6.

The shafts 8b and 11b rotate approximately at the same speeds during the movement of the film in both directions, since the number of revolutions of the motor is approximately the same during the forward and reverse movement of the film strip. Accordingly, the gear ratio between the gears 12 and 16 is selected to move the film at an increased speed during the rewinding process.

Reference to FIGURE 1 and the arrows indicating the the direction of rotation of the gear wheels during the rewinding of the film will show that the ratchet 21 rotates at a faster speed than the teeth 21a. Accordingly, there will be no driving connection between the ratchet 21 and its cooperating gear teeth 21a. It is pointed out, however, that in rewinding the film the speed at which the film is withdrawn from the reel 6 depends upon the quantity of film remaining on the take-up reel 6. As a result, the number of revolutions of the take-up reel will also fluctuate since the reel rotates slowly at the beginning of the rewinding process with the rotative speed thereof increasing toward the end of the rewinding process. For this reason the ratio between the gears 13 and 17 is so selected that the ratchet 21 moves faster than the teeth 21a throughout all stages of the rewinding process. Therefore, the diameter of the gear 17 should be about twice that of the gear 16 if the sprockets 12 and 13 have the same diameter.

When the projector motor is rotating in the forward direction the ratchet 20 will rotate at a greater speed than its corresponding teeth 20a. As a result, the supply reel 5 will freely rotate on the shaft 18 but the ratchet 21 will be drivingly engaged with the teeth 21a so as to drive the take-up reel 6. It is apparent that when the motor is operating in the forward direction the speed of the film strip is determined by the movement of the film advancing member. Thus, the take-up reel 6 is driven in a known manner by a friction coupling acting between the reel 6 and the shaft 19 at a speed corresponding to the speed of the film strip.

Figure 2:
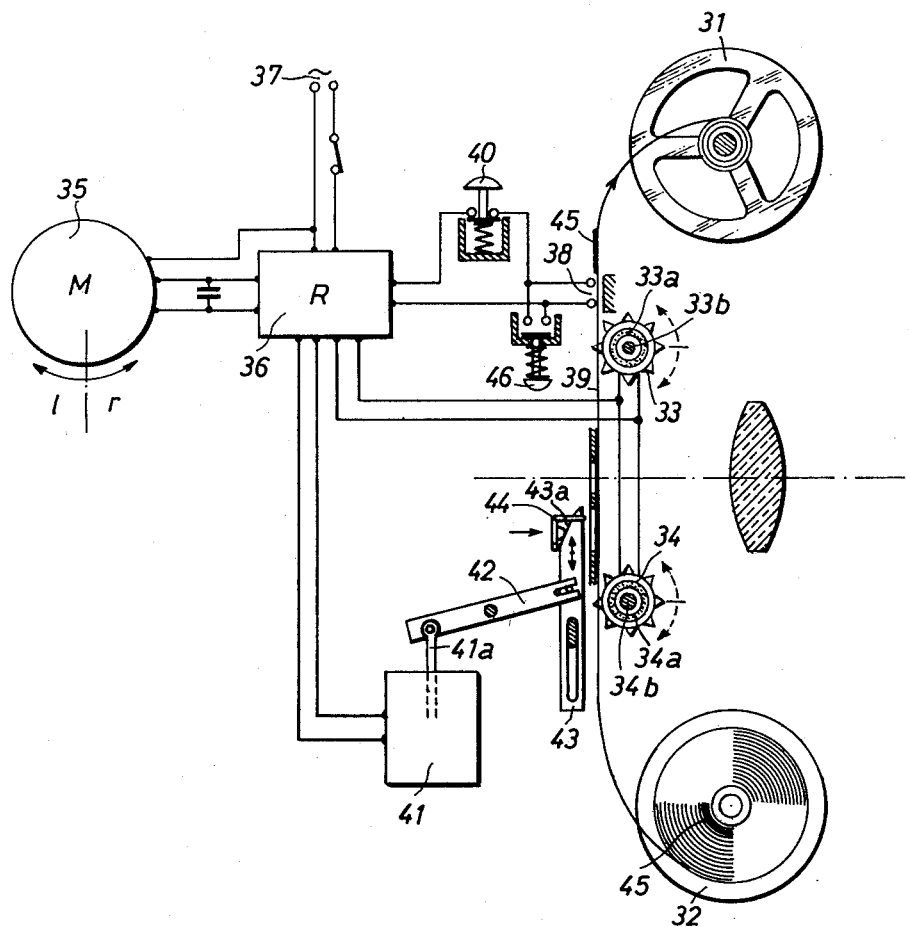
FIGURE 2 is a schematic view of an electrical circuit and components of a motion picture projector wherein withdrawal of the film advancing member is achieved by energization of an electromagnet.

Proceeding next to FIGURE 2, in this embodiment the delivery reel is indicated at 31 and the take-up reel at 32. Mounted between these reels are the sprockets 33 and 34. The sprocket 33 is coupled with the shaft 33b by an electromagnetic coupling 33a and the sprocket 34 is coupled with a shaft 34b by a similar electromagnetic coupling 34a. Both of said shafts are driven by a reversible electric motor 35. In this modification the reversal of the rotation of the motor as well as actuation of the electromagnetic couplings is achieved by a pulsing relay 36.

The relay 36 is energized from a source of electric current 37 and has an impulse contact 38 located at a film guide passage 39. Accordingly, the film strip will pass over the contact 38. There is a disconnecting switch 40 connected between the contact 38 and the pulsing relay 36.

An electromagnet 41 is also electrically connected with the relay 36 and has an armature 41a which is connected to a lever 42. The lever 42 is connected to a slidably mounted member 43 which has a bevel surface 43a which engages a film advancing member 44 in a manner described previously.

Near the end of the film strip there is fastened a foil 45 which is made of an electrically conductive material. When the end of this film approaches, the foil 45 will pass over the contacts 38 to close the contacts and thus energize the relay 36. Energization of the relay 36 will accordingly reverse the direction of the motor 35, disconnect the electromagnetic couplings 33a and 34a and energize the electro-magnet 41.

A similar foil 45 may be mounted near the forward end of the film strip so as to reverse the state of the components of the projector so that the projector is ready to have film passed through it in the forward direction.

As an alternative to the foil at the beginning of the film strip a contactor 46 may be used for energizing the circuit to reverse the state of the components of the projector. The contactor 46 may also be used when no foils whatsoever are mounted on the strip and reversal of the projector must be accomplished manually.

It may be desirable to attach conductive foils 45 to both ends of the film strip so that during operation of the projector these foils will cause the projector to alternately operate in the forward and reverse directions. This arrangement might be used for advertising purposes.

In order to thread the film into a projector having an automatic film feeding it is necessary to interrupt the circuit of the pulsing relay 36 by the circuit breaker 40 to permit the foil 45 at the beginning of a film to pass over the contacts 38 without reversing the state of the components of the projector.

Figure 3:
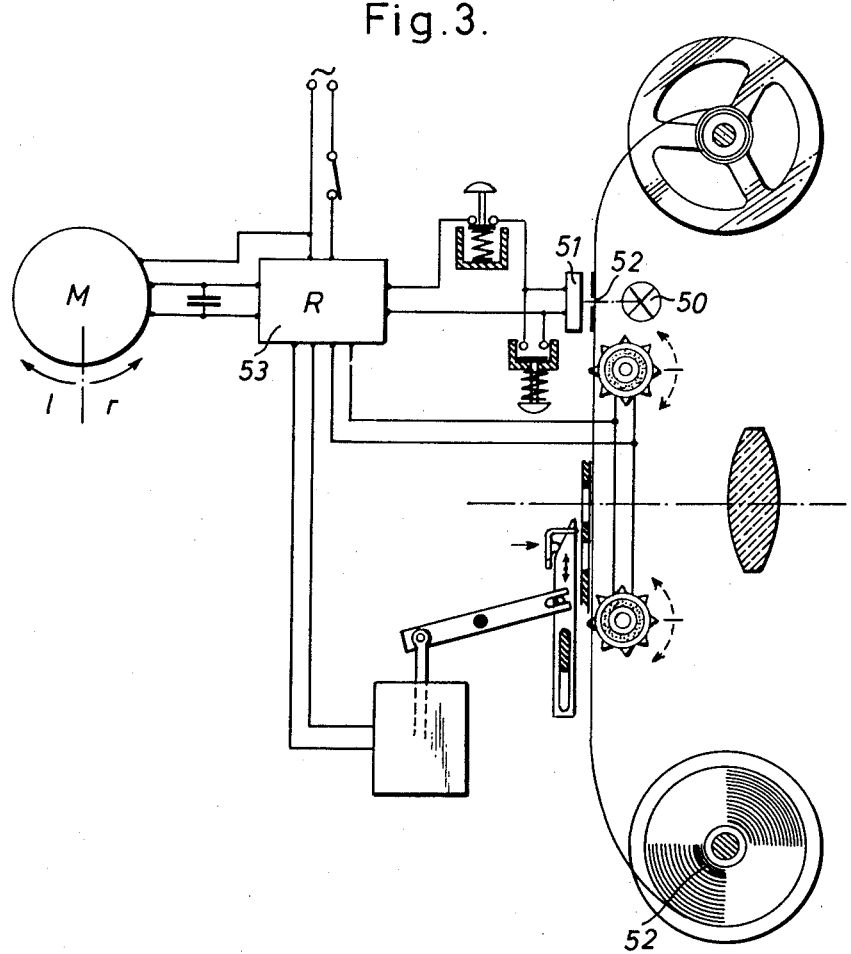
FIGURE 3 is a schematic view similar to that of FIGURE 2, but wherein the electrical circuit is energized by a photoelectric cell which is actuated by portions of the film strip.

Proceeding next to FIGURE 3 there is shown a modification which is substantially similar to that of FIGURE 2 but wherein the circuit is energized by the amount of light passing through a predetermined portion of the film strip. In this modification there is provided a source of light 50 and a photoelectric cell 51 which cell is connected in an electrical circuit including a pulsing relay 53. The film strip is provided with an aperture 52 in an emulsion thereon. Accordingly, when the aperture 52 passes in front of the photoelectric cell a sufficient quantity of light will be momentarily supplied to the photoelectric cell 51 to energize the relay 53. The several components of the projector will then be reversed in the manner described with respect to FIGURE 2.

It is therefore apparent that the present invention discloses a simple yet effective structure for withdrawing the film advancing member from the path of a film concurrently with the reversal of the direction of rotation of the driving motor of the projector.

It will be understood that this invention is susceptible to modification in order to adapt it to different usages and conditions and, accordingly, it is desired to comprehend such modifications within this invention as may fall within the scope of the appended claims.

What is claimed is:
1. A motion picture projector comprising a film guide plate having a projecting aperture therein, a film advancing member projecting into the path of a film strip moving over said guide plate so as to intermittently advance the film strip past said projecting aperture and having a portion extending transversely to the path of movement thereof, a pay-out reel for a film strip, a take-up reel for a film strip, means for moving said film strip in a forward direction over said guide plate while driving said take-up reel and for moving said film strip in a reverse direction while driving said pay-out reel to rewind said film strip, a wedge-shaped slider engageable with said portion of said film advancing member to cam said advancing member outwardly of the path of a film strip passing over said film guide plate, and means for actuating said slider when said film strip is moved in a reverse direction and the pay-out reel is driven to rewind the film strip.

2. A motion picture projector comprising a film guide plate having a projecting aperture therein, a film advancing member projecting into the path of a film strip moving over said guide plate so as to intermittently advance the film strip past said projecting aperture, a pay-out reel for a film strip, a take-up reel for a film strip, means for moving said film strip in a forward direction over said guide plate while driving said take-up reel and for moving said film strip in a reverse direction while driving said pay-out reel to rewind said film strip, a wedge-shaped slider engageable with said film advancing member to cam said advancing member outwardly of the path of a film strip passing over said film guide plate, a reverse button on said projector, a linkage interconnecting said slider and said reverse button so that actuation of said reverse button to reverse the movement of the film strip and to drive the pay-out reel to rewind the film strip will withdraw said film advancing member from the path of a film strip.

3. A motion picture projector comprising a film guide plate having a projecting aperture therein, a film advancing member projecting into the path of a film strip moving over said guide plate so as to intermittently advance the film strip past said projecting aperture, a pay-out reel for a film strip, a take-up reel for a film strip, means for moving said film strip in a forward direction over said guide plate while driving said take-up reel and for moving said film strip in a reverse direction while driving said pay-out reel to rewind said film strip, sprocket wheels on both sides of said film guide plate to feed and withdraw a film strip over said guide plate, an electric motor for driving said sprocket wheels, electromagnetic clutches for driving said sprockets when a film strip is moving in the forward direction, electromagnetic means for withdrawing said film advancing member from the path of a film strip, and electrical means for reversing the rotation of the electric motor so as to disengage said electromagnetic clutches and to energize said film advancing member electromagnetic means to withdraw said member from the path of a film strip.

4. A motion picture projector comprising a film guide plate having a projecting aperture therein, a film advancing member projecting into the path of a film strip moving over said guide plate so as to intermittently advance the film strip past said projecting aperture, a pay-out reel for a film strip, a take-up reel for a film strip, means for moving said film strip in a forward direction over said guide plate while driving said take-up reel and for moving said film strip in a reverse direction while driving said pay-out reel to rewind said film strip, a wedge-shaped slider engageable with said film advancing member to cam said advancing member outwardly of the path of a film strip passing over said film guide plate, electromagnetic means operatively connected to said slider for actuating the same, a reverse button on said projector, and means for interconnecting said slider and said reverse button so that actuation of said reverse button to reverse the movement of the film strip and to drive the pay-out reel to rewind the film strip will energize said electromagnetic means whereby said film advancing member will be withdrawn from the path of a film strip.

References Cited in the file of this patent
UNITED STATES PATENTS
1,944,024    Foster et al. _____ Jan. 16, 1934